US008915986B2

(12) United States Patent
O'Leary

(10) Patent No.: US 8,915,986 B2
(45) Date of Patent: Dec. 23, 2014

(54) AIR FILTER

(75) Inventor: Richard R. O'Leary, Katy, TX (US)

(73) Assignee: Universal Technologies, Inc., Baltimore, MD (US)

( * ) Notice: Subject to any disclaimer, the term of this patent is extended or adjusted under 35 U.S.C. 154(b) by 456 days.

(21) Appl. No.: 12/420,050

(22) Filed: Apr. 7, 2009

(65) Prior Publication Data

US 2009/0249755 A1 Oct. 8, 2009

Related U.S. Application Data

(60) Provisional application No. 61/043,164, filed on Apr. 8, 2008.

(51) Int. Cl.
*B01D 46/00* (2006.01)
*B01D 46/10* (2006.01)
*B01D 46/52* (2006.01)

(52) U.S. Cl.
CPC .............. *B01D 46/10* (2013.01); *B01D 46/523* (2013.01); *B01D 46/0005* (2013.01); *B01D 46/521* (2013.01); *B01D 2265/06* (2013.01); *Y10S 55/31* (2013.01)
USPC .................... 55/497; 55/499; 55/500; 55/501; 55/521; 55/DIG. 31

(58) Field of Classification Search
CPC .. B01D 46/0005; B01D 46/10; B01D 46/521; B01D 46/523; B01D 2265/02; B01D 2265/06
USPC .................... 55/492, 497, 499, 521, 500, 501, 55/DIG. 31
See application file for complete search history.

(56) References Cited

U.S. PATENT DOCUMENTS

| 2,917,130 | A | * | 12/1959 | Powers .............................. 96/67 |
| 3,164,456 | A | * | 1/1965 | Brainerd, Jr. et al. ........... 55/500 |
| 3,177,637 | A | * | 4/1965 | Davis ............................... 55/483 |
| 3,183,286 | A | * | 5/1965 | Harms ......................... 264/46.4 |
| 3,234,717 | A | * | 2/1966 | Korn ............................... 55/499 |
| 3,471,023 | A | * | 10/1969 | Rosaen ......................... 210/223 |
| 3,793,813 | A | | 2/1974 | McAllister |
| 4,004,899 | A | * | 1/1977 | Giacovas ........................ 55/499 |
| 4,363,643 | A | | 12/1982 | Elbrader |
| 4,547,950 | A | | 10/1985 | Thompson |
| 4,885,015 | A | | 12/1989 | Goulet et al. |
| 5,273,563 | A | | 12/1993 | Pasch et al. |
| 5,531,892 | A | | 7/1996 | Duffy |
| 5,620,505 | A | | 4/1997 | Koch et al. |
| 5,743,927 | A | | 4/1998 | Osendorf |
| 5,792,229 | A | | 8/1998 | Sassa et al. |
| 5,843,198 | A | | 12/1998 | Walker |
| 5,914,413 | A | | 6/1999 | Andersson |
| 6,179,891 | B1 | | 1/2001 | Knudsen et al. |
| 6,319,300 | B1 | | 11/2001 | Chen |
| 6,398,839 | B2 | | 6/2002 | Choi |

(Continued)

*Primary Examiner* — Robert Clemente
(74) *Attorney, Agent, or Firm* — McGuireWoods LLP

(57) ABSTRACT

An apparatus and method for filtering air in residential and commercial applications is described herein. The air filter may have a support frame which secures to the intake grille of an HVAC system. A filter media may be placed in the support frame to filter air as it passes through the air filter. The filter media may be replaced when the filter media becomes too dirty to effectively filter air. The dirty filter media may be removed from the frame and a new clean media may be replaced in the frame.

9 Claims, 8 Drawing Sheets

(56) References Cited

U.S. PATENT DOCUMENTS

| | | |
|---|---|---|
| 6,454,826 B2 | 9/2002 | Fath et al. |
| 6,454,834 B1 | 9/2002 | Livingstone |
| 6,656,243 B2 | 12/2003 | Hodge |
| 6,723,150 B2 | 4/2004 | Parker |
| 6,814,773 B2 | 11/2004 | Shah et al. |
| 6,843,820 B2 | 1/2005 | Kubokawa |
| 6,846,342 B2 | 1/2005 | Mertz et al. |
| 7,004,989 B2 | 2/2006 | Karlsson |
| 7,090,713 B2 | 8/2006 | Terlson |
| 2002/0108359 A1* | 8/2002 | Powell .......................... 55/482 |

* cited by examiner

AIR FILTER

CROSS-REFERENCE TO RELATED APPLICATION

This application claims the priority benefit of U.S. provisional patent application No. 61/043,164, titled "Air Filter," filed Apr. 8, 2008. This related application is hereby incorporated by reference in its entirety.

BACKGROUND

Embodiments described herein relate to apparatus and methods for filtering air in a heating, ventilating and air conditioning (HVAC) system.

Air filters are used in commercial, residential and industrial HVAC systems to filter air that passes through the system. The filters remove some dust from the air as it passes through the filter. The removal of the dust may protect the components of the HVAC system from becoming damaged by the dust.

Typical air filters for HVAC systems are one inch thick disposable filters having a fiberglass mesh. The fiberglass mesh is supported by a cardboard frame around the edges of the filter. A wire mesh spans across the central part of the filter in order to hold the fiberglass in place. The fiberglass mesh does not prevent most particles from passing through the filter. Further, the fiberglass filters are bulky and easily damaged. Due to the bulk the filters require a large amount of space to transport several units to a commercial, and/or retail outlet.

SUMMARY

Embodiments disclosed herein include an air filter comprising a filter media and a support frame. The support frame is for supporting the filter media. The support frame comprises a first portion adapted to secure to a grille of an air intake; and a second portion adapted to extend into a duct, wherein the filter media is located within at least a portion of the second portion.

Embodiments disclosed herein include an air filter, comprising: a replaceable pleated filter media, wherein the pleated filter media has a plurality of peaks and valleys and a support frame. The support frame comprises two substantially perpendicular sides, wherein the perpendicular sides are configured to be substantially perpendicular to the peaks and valleys of the pleated media. The support frame further comprises two substantially parallel sides, wherein the parallel sides are configured to be substantially parallel to the peaks and valleys of the pleated media and wherein a portion of each of the parallel sides is coupleable to a portion of the perpendicular side. The air filter further comprises one or more support rods, wherein the support rods span an interior of the support frame in a direction substantially parallel with the peaks and valleys and wherein at least one of the support rods is configured to engage a portion of the filter media.

Embodiments disclosed herein include a method for filtering air in an HVAC system. The method may include placing a filter media in a support frame and securing the support frame to a return air filter grille of an existing air intake of the HVAC system. The method may further include filtering air through the filter media and removing the filter media from the support frame when the filter media becomes dirty. The method may further include replacing the filter media with a new filter media in the support frame.

Embodiments disclosed herein include a method for replacing air filters in a retail outlet. The method may include placing multiple filter media in a container and moving the container to a roof of the retail outlet. The method may further include removing a support frame and a used filter media from a HVAC system and removing the used filter media from the support frame. The method may further include replacing the used filter media with one of the multiple filter media from the container and inserting the support frame and the filter media back in the HVAC system. The method may further include walking to a second HVAC system on the roof of the retail outlet.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary apparatus, methods, techniques, and instruction sequences that embody techniques of the present inventive subject matter. However, it is understood that the described embodiments may be practiced without these specific details.

Embodiments described herein comprise apparatus and methods for filtering air in an HVAC system using an air filter. The air filter may be used in any type of HVAC system including, but not limited to, a residential, a commercial and an industrial HVAC system. The air filter is typically placed in the HVAC system near an air intake. As air is pulled into the HVAC system at the air intake, the air filter collects dust, debris and other particles from the air. The removal of the particles from the air entering the HVAC system may prevent the mechanical equipment of the HVAC system from becoming damaged by the particles. Further, the air filter substantially prevents the dust, debris and other particles from circulating through the air ducts and being pumped into the building which is being heated or cooled by the HVAC system. The air filter may have a filter media and a support frame. The support frame supports the filter media and is configured to secure the filter media within the HVAC system. The support frame may be sized and configured to be inserted into the HVAC system at the same location as traditional cardboard air filters. The support frame may be collapsible in order to ship the support frame in a space saving manner. The support frame may include one or more support rods which run substantially parallel within the interior of the support frame. The support rods may be configured to support the filter media within the support frame. The media may be a pleated media having a series of peaks and valleys. The filter media may be removeably installed in the support frame. When installed in the support frame the support rods may engage some or all of the peaks of the filter media thereby preventing the filter media from being pulled into the HVAC ducting. When the filter media becomes inefficient due to the amount of dust and/or particles built up on the media, the filter media may be replaced without replacing the support frame. Thus, the filter media is simply removed from the support frame. A new filter media is obtained and secured within the support frame. The support frame with the new filter media is placed back in the HVAC system and the air filter filters the air coming into the HVAC system. The used media may be placed in the garbage, or recycled. The air filter may include a change indicator. The change indicator may inform a user when a change of the filter media is necessary.

Figure 1:
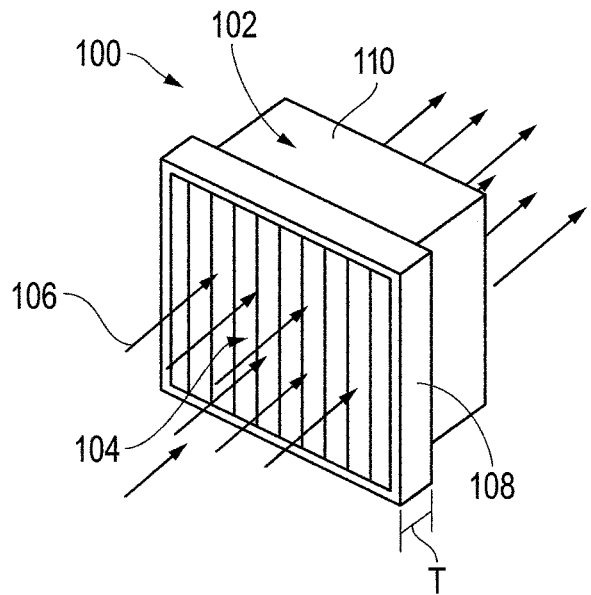
FIG. 1 depicts a diagram illustrating a schematic perspective view of an air filter in an embodiment.

FIG. 1 depicts a schematic perspective view of an air filter 100 in an embodiment. The air filter 100 may include a support frame 102 and a filter media 104. The support frame 102 may be adapted to secure the air filter 100 within the return air filter grille, or grille, not shown, of an existing HVAC system. The HVAC system as described herein may be any HVAC system for handling air, including, but not limited to, residential, commercial and industrial HVAC systems. The size of the return air filter grilles may vary in different HVAC systems; however, the support frame 102 may be configured to secure within a specific return air grille size, or be adjusted to fit within different sized return air grilles. The filter media 104 may be configured to be removed from the support frame 102 and replaced with a new filter media 104 without replacing the support frame 102. When the new filter media 104 is secured in the support frame 102, the user may place the air filter 100 within the return air grille. The HVAC system pulls air through the air filter 100 in the air flow direction, as shown by arrows 106. The air may flow through the air filter 100 substantially unobstructed as there are no frame members located in the interior upstream side of the air filter. The filter media 104 removes dust, dirt, and/or particles from the air as the air passes through the air filter 100.

The support frame 102 may include a grille portion 108 and a duct portion 110 in an embodiment. The grille portion 108 of the support frame 102 may be configured to fit within the return air grille of the HVAC system and secure the air filter 100 to the grille. To this end, the grille portion 108 of the support frame 102 may be specifically sized to fit within a certain model of HVAC system. The grille portion 108 of the support frame 102 may be placed in the return air grille in a similar manner as traditional cardboard air filters are placed in the return air grille. There may be any number of models and sizes of support frames 102 in order to ensure that the grille portion 108 of the support frame 102 fits in a number of varying HVAC systems. For example, the standard residential return air filter grille requires a 20"×20" air filter; however, it should be appreciated that the support frames discussed herein may be sized to fit in any size return air filter grille. The grille portion 108 of the support frame 102 may have a similar thickness T as the traditional cardboard air filter sized for the particular HVAC system. Further, the grille portion 108 of the support frame 102 may have a different thickness T than the traditional cardboard air filter. For example, the grille portion 108 of the support frame 102 may have a substantially smaller thickness T than the traditional cardboard air filter. The smaller thickness T may allow the grille portion 108, and thereby the support frame 102 to be shipped in a smaller, or more collapsible form. If the grille portion 108 has a smaller thickness T, there may be one or more spacers (not shown), and/or biasing members, coupleable to the grille portion 108 which are configured to secure the grille portion 108 of the support frame 102 within the return air filter grille. The spacers may couple to the grille portion 108 having a smaller thickness T in order to make the thickness of the grille portion 108 and the spacer substantially similar to the thickness of the return air filter grille.

The duct portion 110 of the support frame 102 may be configured to extend through the return air filter grille and into the duct, or air intake, of the HVAC system. The duct portion 110 of the support frame 102 may support a portion, or all of the filter media 104 beyond the grille portion 108 of the support frame 102 and into the duct of the HVAC system. Because the duct portion 110 of the support frame 102 supports the filter media 102 beyond the grille portion 108 of the support frame, a deeper filter media 104 may be used. For example, the grille portion 108 may have a thickness T of 1" and the duct portion 110 of the support frame 102 may extend beyond the grille portion 108 of the support frame another 3", thereby making the total thickness of the support frame 102 approximately 4". A filter media 104 having substantially a 4" depth may be placed in the support frame 102 by engaging both the grille portion 108 and the duct portion 110 of the support frame 102. The additional filter media 104 beyond the thickness of the traditional cardboard filter allows the air filter 100 to be more efficient. For example, the traditional cardboard air filter may be 1" thick, wherein the filter media 104 described above may have a 4" depth from the peak to the valley of the pleat. Thus, the filter media 104 may be about 4 times as efficient as a traditional cardboard filter. The larger surface area for filtering may allow the air filter 100 to have a longer life than the traditional cardboard air filter. Although the grille portion 108 of the support frame 102 is described as being 1" and the duct portion 110 of the support frame 102 is described as being 3" it should be appreciated that the grille portion 108 and the duct portion 110 may each have any suitable depth depending on the HVAC system and the requirements of the user and the system. For example, the grille portion 108 may be 2" and the duct portion 110 may be 2", further any combination of sizes may be used.

Figure 2:
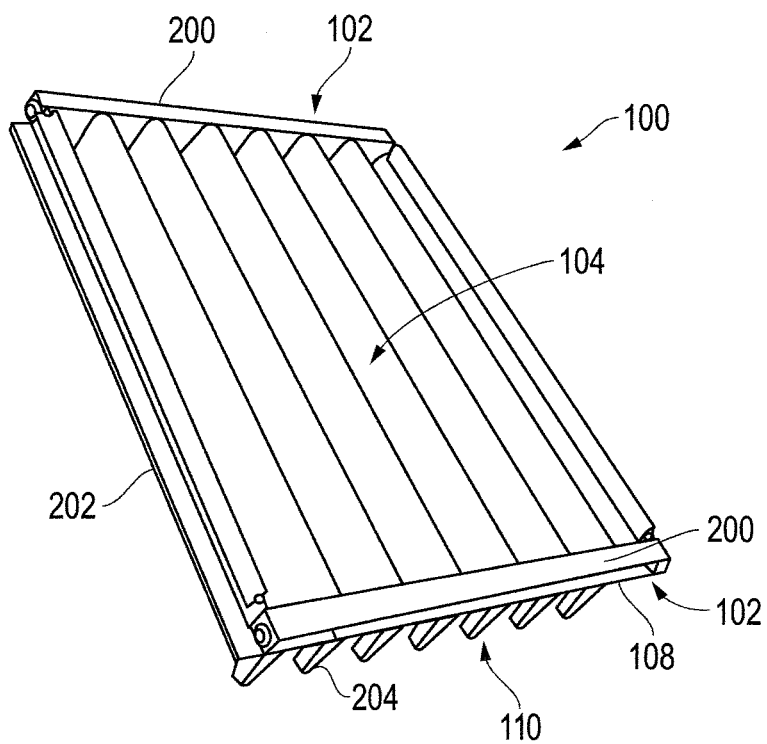
FIG. 2 depicts a diagram illustrating a perspective view of an air filter in an embodiment.

FIGS. 2 and 3 show a perspective view and an exploded perspective view of an air filter 100 according to one embodiment described herein. The support frame 102 is shown as having two perpendicular sides 200 and two parallel sides 202. The perpendicular sides 200 may be configured to extend substantially perpendicular to the direction of the pleats on the filter media 104. The parallel sides 202 may be configured to extend substantially parallel to the direction of the pleats on the filter media 104. When connected together, each end of the parallel sides 202 may couple to the end of the perpendicular side 200 thereby forming a perimeter. The filter media 104 may be adapted to secure to the support frame 102 substantially within the perimeter. The parallel sides 202 and/or the perpendicular sides 200 may include the grille portion 108 and/or the duct portion 110.

Figure 3A:
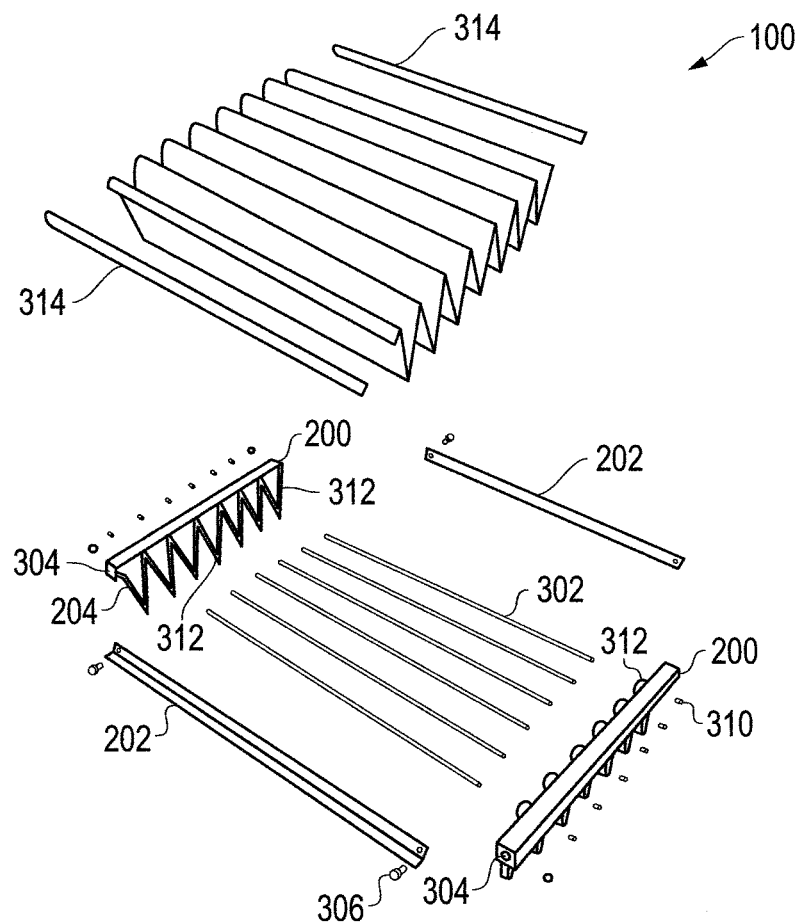
FIG. 3A depicts a diagram illustrating an exploded perspective view of an air filter in an embodiment.

The perpendicular sides 200, as shown in FIGS. 2 and 3A, include both the grille portion 108 and the duct portion 110 of the support frame 102. The grille portion 108 of the perpendicular sides 110, as shown, is a substantially rectangular shape which is adapted to secure in the grille of an HVAC system. The grille portion 108 of the perpendicular side 200 may be configured to secure one or more support rods 302 to the support frame 102, as will be described in more detail below. Further, the grille portion 108 of the perpendicular side 200 may be configured to couple to the parallel side 202. As shown, the parallel side 202 includes an aperture 304 proximate each terminal end of the parallel side 202. The aperture 304 may be configured to receive a fastening device 306. The fastening device 306 may secure the parallel side 202 to the perpendicular side 200. The grille portion 108 of the perpendicular side 200 may further include a recess 308, shown in FIG. 3B. Although the grille portion 108 of the perpendicular side 200 is described as having a rectangular shape, it should be appreciated that the perpendicular side 200 may have any suitable shape capable of supporting a portion of the air filter 100 and securing the air filter 100 to an HVAC system including, but not limited to, an L-shaped bracket, a tubular member, a flat plate which may, or may not, include support members for securing the support frame to the grille, a plate with one or more formed grooves, a rail, a plate, and the like.

Figure 3B:
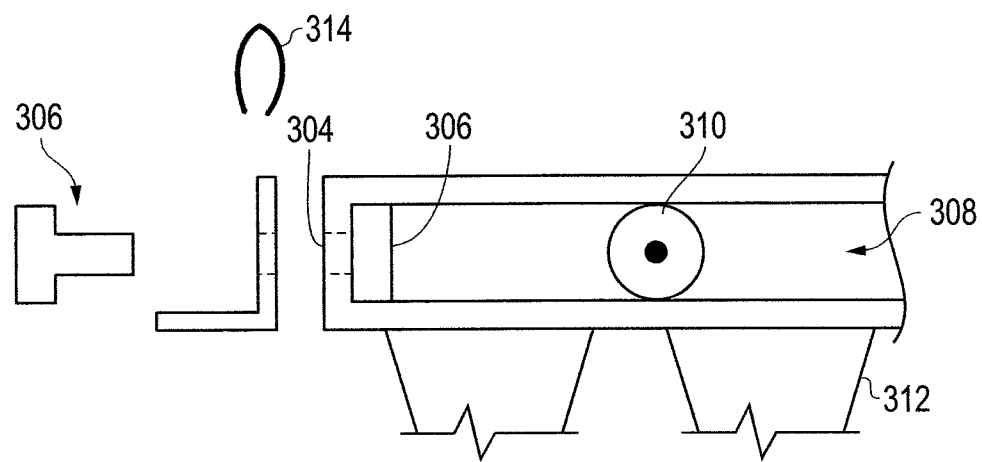
FIG. 3B depicts a diagram illustrating a portion of an air filter in an embodiment.

The recess 308, as shown in FIG. 3B, may be configured to house at least a portion of the fastener 306 and a rod fastener 310. The recess 308 may protect the fasteners 306 and the rod fasteners 310 from damage once the support frame 102 is assembled. The recess 308, as shown, faces radially away from the interior of the support frame 102; however, it should be appreciated that the recess 308 may face any suitable direction. Further, the recess 308 may protect the grille, and/or duct work, of the HVAC system from being damaged by the fasteners 306 and/or the rod fasteners 310 during installation, replacement, and use. The recess 308 is shown as a substantially rectangular recess in the grille portion 108 of the perpendicular side 200; however, it should be appreciated that the recess 308 may be any suitable shape including a plurality of shapes. Further, it should be appreciated that the recess 308 is optional and may not be necessary for the support frame 102.

The perpendicular sides 200 may include one or more media supports 312. The media supports 312, as shown in FIGS. 3A and 3B, may be configured to support a portion of the filter media 104 proximate the perpendicular side 200. As shown, the media supports 312 extend toward the interior of the air filter 100 from the perpendicular sides 200. The media supports 312 are shown as being located on and extending from the grille portion 108 and the duct portion 110 of the support frame 102; however, it should be appreciated that the media supports 312 may be located only on the grille portion 108 or only on the duct portion 110. The media supports 312 may have a shape which conforms to the shape of the installed filter media 104. For example, when using a pleated media, the media supports 312 may have a substantially triangular shape, as shown in FIG. 3. Although shown as having a triangular shape, it should be appreciated that the media supports 312 may have any suitable shape configured to support the perimeter edge of the filter media 104 including, but not limited to, triangular with a rounded peak and valley, triangular with a flat peak and valley, rounded peak with angled valley, sinusoidal, flat, and the like . .

The media supports 312 may be configured to support a portion of the perimeter of the filter media 104. Further, the media supports 312 may be configured to prevent air flow between the support frame 102 and the filter media 104. The media supports 312 may extend any suitable distance within the interior of the support frame 102, so long as the media supports 312 secure the filter media 104 while allowing air to flow through the interior of the filter media 104. For example, the media supports 312 may extend ¼" into the interior of the air filter 100. Further, it should be appreciated that the media support 312 may extend any distance into the interior of the air filter including, but not limited to, ¹⁄₁₆", ⅛", ⅜," ½", ⅝", 1", 2", 3," 4", 5", 6" and any dimension there between or larger. In order secure the filter media 104 to the media supports 312 there may be one or more media clamps (not shown) configured to secure the filter media 104 to the media supports 312. The media clamps may have any suitable form, so long as they assist in securing the filter media 104 to the media supports 312 including, but not limited to, a shaped piece having a substantially the same shape as the media supports which clamps the filter media 104 between media support 312 and the shaped piece, a clamp, one or more leaf springs and the like.

Figure 7A:
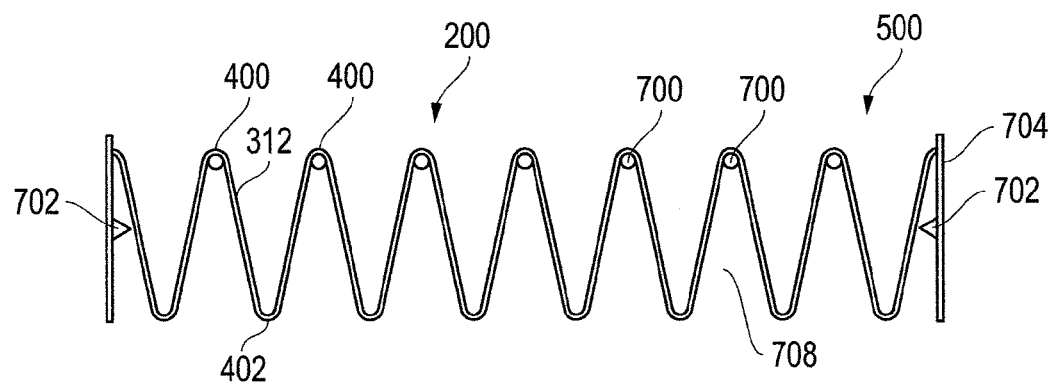
FIG. 7A depicts a diagram illustrating a side view of a portion of an air filter in another embodiment.
Figure 7B:
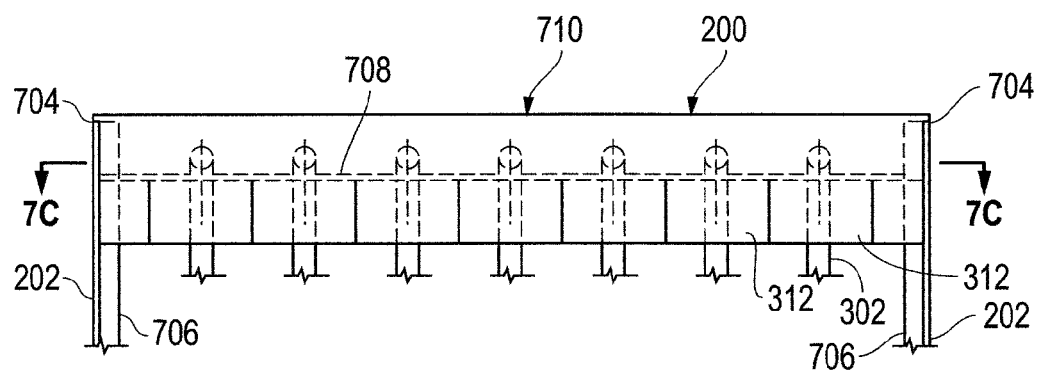
FIG. 7B depicts a diagram illustrating a top view of a portion of an air filter in another embodiment.
Figure 7C:
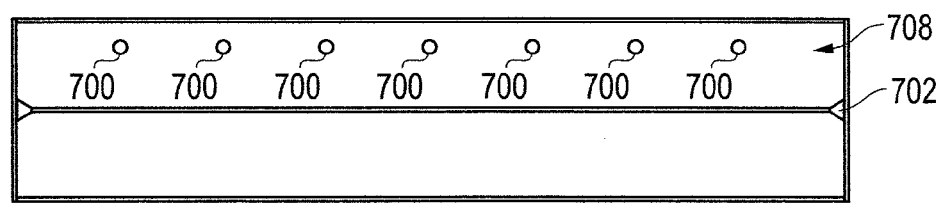
FIG. 7C depicts a diagram illustrating a side view of a portion of an air filter in another embodiment.
Figure 7D:
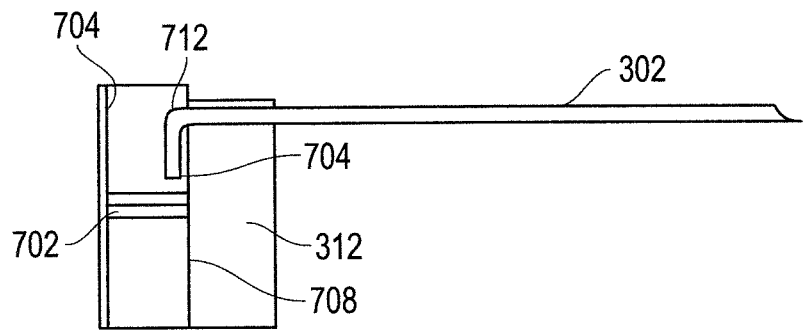
FIG. 7D depicts a diagram illustrating an end view of a portion of an air filter in another embodiment.
Figure 7E:
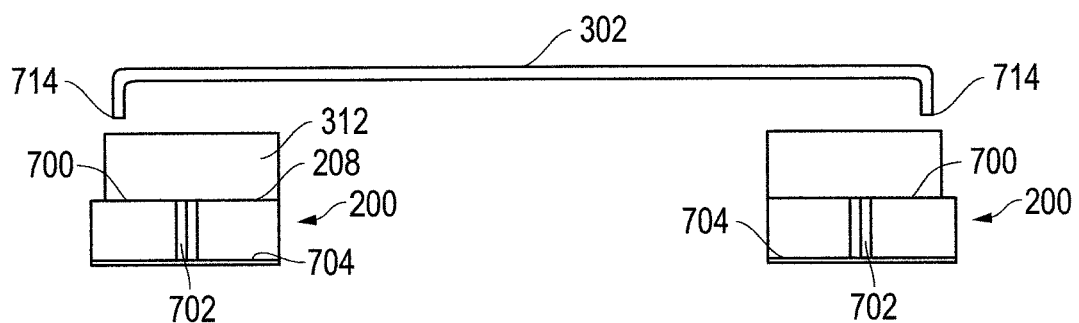
FIG. 7E depicts a diagram illustrating an end view of a portion of an air filter in another embodiment.
Figure 7F:
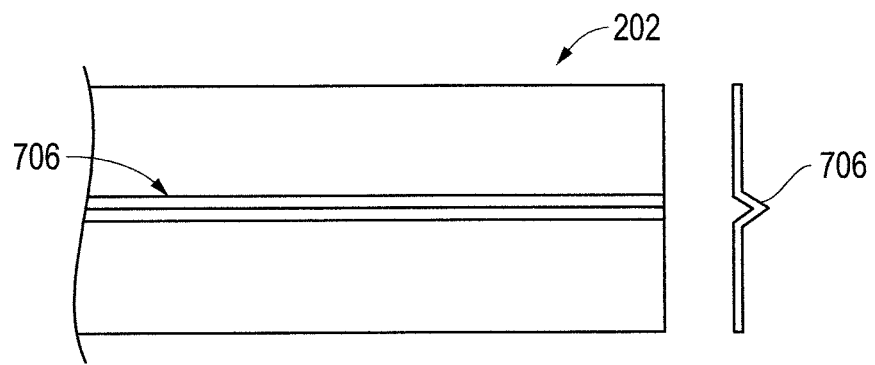
FIG. 7F depicts a diagram illustrating a side view of a portion of an air filter in another embodiment.
Figure 7G:
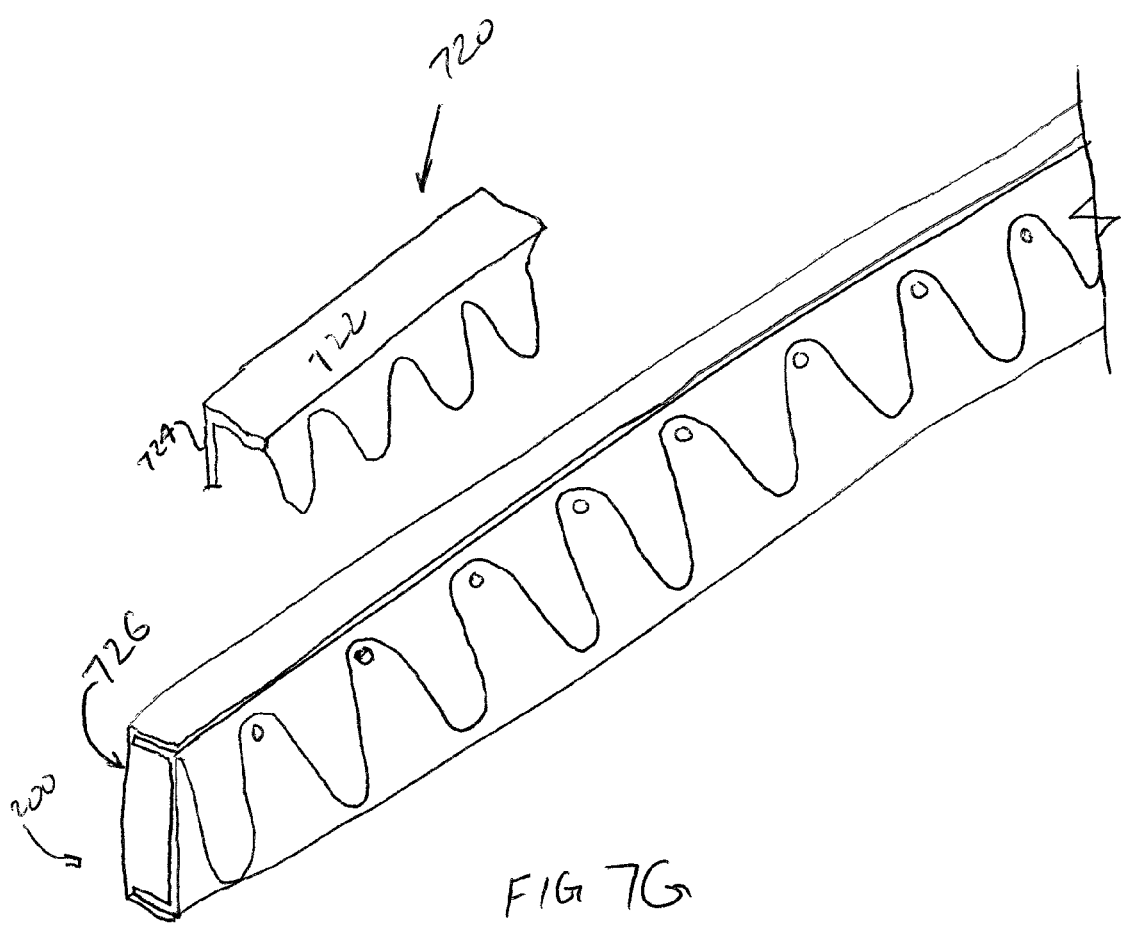
FIG. 7G depicts a diagram illustrating a perspective view of a portion of an air filter in another embodiment.

In one example, the media clamp is an upper media support 720, as shown in FIG. 7G. The upper media support 720 may be configured to substantially mirror the shape of the media support 312. The upper media support 720 may be configured to secure the filter media 104 between the upper media support 720 and the media support 312. Thus, a portion of the perimeter of the filter media 104 may be placed on media support 312. The upper media support 720 may then engage the filter media 104 on top of the filter media 104. The upper media support 720 may have a mirrored shape to the media support 312 thereby allowing the upper media support 720 to engage a large portion of the filter media 104 which is supported by the media support 312. The upper media support 720 may extend the entire length of the media supports 312, or only a portion thereof. Further, the upper media supports 720 may only include a portion that mirrors the shape of the media supports 312, or the upper media supports 720 may include a support structure for supporting the upper media support 720. In one example, the upper media support 720 may have a support structure which may include a top portion 722 that fits over the top of the perpendicular side 200. Further, the support structure may have a back portion 724 which fits over the top of the perpendicular side 200 and onto the exterior surface of the perpendicular side 200 in order to secure the support structure of the upper media support to the media support 312 and/or the perpendicular side 200. The perpendicular side 200 may include a channel 726 which a portion of the perpendicular side 200 fits within. The channel 726 may act as a housing and prevent a portion of the perpendicular side 200 from being damaged. Further, the channel 726 may provide support for the upper media support 720 to secure to the perpendicular side.

In addition to, or an alternative to the media clamp, the air filter 100 may include an optional adhesive surface on the filter media 104 and/or the media supports 312. The adhesive surface may be any suitable adhesive surface including, but not limited to, a glue, a hook and loop system, and the like.

The duct portion 110 of the parallel side 200 may be integral with the grille portion 108 or a separate piece which may couple to the grille portion 108. As shown in FIGS. 2, 3A and 3B, the duct portion 110 is substantially flat having a shape which substantially conforms to the shape of the media supports 312. The duct portion 110 may be an optional portion for the air filter 100. The duct portion 110 may only be necessary when trying to increase the life and efficiency of the air filter 100 by using a larger filter media 104 than is typically sized for that particular HVAC system. The duct portion 110 may have any suitable size and shape so long as the duct portion 110 supports the media supports 312 as they extend beyond the grille portion 108 including, but not limited to, rectangular shaped, triangular shaped, sinusoidal, and the like.

The parallel sides 202 may be configured to secure to the perpendicular sides 200 with the fastening device 306 in order to form the perimeter. The parallel side 202 may have any shape suitable for forming and supporting a portion of the perimeter of the support frame 104. As shown in FIGS. 2, 3A and 3B, the parallel sides 202 are L-shaped brackets. The L-shaped brackets have a support frame side and a grille side. The support frame side is configured to engage the perpendicular sides 200 and optionally the filter media 104. The grille side may be configured to engage a portion of the grille of the HVAC system thereby assisting in securing the air filter 100 in the grille. Although shown as an L-shaped bracket it should be appreciated that the parallel side 202 may have any suitable shape including but not limited to, any of the shapes described for the grille portion 108 of the perpendicular sides 200. The shape of the parallel side 202 may be configured to prevent torque or twisting in the assembled support frame 102. The filter media 104 may attach to the parallel side 202 in a manner that prevents the flow of air between the parallel side 202 and the filter media 104. In another embodiment, the filter media 104 may attach to a member that is separate from or coupled to the parallel sides 202. The filter media 104 may secure to the parallel side 202 near the terminal end of the filter media 104. The filter media 104 may secure to the support frame side and/or the grille side of the perpendicular side 202.

A filter media clips 314 may secure the filter media 104 to the parallel side 202. The filter media clip 314 may be any suitable device capable of securing the filter media 104 to the parallel sides 202 and/or the support frame 102. In one embodiment, the filter media clip 314 is a clamp which extends substantially the length of a side of the frame, as shown in FIGS. 3A and 3B. Thus, a portion of the filter media 104 may be placed over the edge of the parallel side 202. The filter media clip 314 may be opened and placed over both the filter media 104 and the parallel side 202. The filter media clip 314 may then be closed thereby securing the filter media 104 to the support frame 102. If there is an excessive amount of filter media 104 extending beyond the filter media clip 314, the filter media 104 may be cut to fit. Although the filter media clip 314 is described as being a clamp extending substantially the length of the side of the support frame 102, it should be appreciated that any suitable device may be used to secure the filter media 104 to the support frame 102 including, but not limited to, an adhesive, a loop and hook system, a clip, one or more hooks for gripping the filter media 104, one or more magnets, one or more wire clips, and the like.

The fastening device 306 may be any device suitable for securing the parallel side 202 to the perpendicular side 200. As shown in FIGS. 3A and 3B, the fastening device is a screw which screws in to a separate nut located in the recess 308. It should be appreciated that the screw may screw directly into the parallel side 202 and/or the perpendicular side 200. The recess 308 may be configured to secure the nut of the fastening device within the recess 308. With the nut secured in the recess 308, the user may turn the screw while the recess 308 prevents the nut from rotating. Further, it should be appreciated that the fastening device 306 may be any suitable device for securing the perpendicular side 200 to the parallel side 202 together including, but not limited to, a press fitting, a weld, an adhesive, nail, a rivet, and the like. Although the fastening device 306 is described as securing the perpendicular side 200 to the parallel side 202, it should be appreciated that the support frame 102 may be one integral piece thereby not needing the fastening device 306.

The support rods 302 may extend from one side of the perimeter of the support frame 102 to the other side of the support frame 102. The support rods 302 may be configured to support the interior of the filter media 104 between the perimeter of the support frame 102. As shown in FIG. 3A, the support rods 302 extend substantially parallel between the perpendicular sides 200 of the support frame 102. The support rods 302 may be located proximate a peak of the media supports 312 in an embodiment. Thus, the filter media 104 may be supported proximate a peak of the media support 312 near the perimeter of the support frame 102, and the filter media 104 may be supported at the filter media's 104 peak in the interior of the air filter 100 by the support rods 302. A portion of the filter media 104 is configured to rest on the support rods 302 during use in the HVAC system. The support rods 302 as shown are rods; however, it should be appreciated that the support rods 302 may have any suitable shape including, but not limited to, a tubular shape, a rectangular shape, a string, and the like. Further, although the support rods 302 are shown as extending in one direction in a substantially parallel manner across the support frame 102, it should be appreciated that the support rods may cross the support frame 102 in multiple directions with multiple spacing. In an embodiment, the support rods 302 may be substantially flexible members. These flexible support rods 302 may be preinstalled in the support frame 102. During shipping the perpendicular sides may be placed proximate one another and the flexible support rods 302 may bend without disengaging the perpendicular sides 200. In this embodiment, the user does not need to secure the support rods 302 to the support frame 102, but simply couple the parallel sides 202 to the perpendicular sides 200, thereby making the support rods extend to a taught, or extended, position.

The support rods 302 may couple to the support frame 102 in any suitable manner. As shown in FIGS. 3A and 3B, the ends of the support rods 302 extend through the perpendicular sides 200 and gripped by the rod fasteners 310. In one embodiment, the rod fasteners 310 may be any device suitable for gripping the support rods 302 including, but not limited to, a clamp, a crimp, a bend in the support rod 302, a knot, and the like. Further, it should be appreciated that the support rods 302 may be coupled to the support frame 102 in any suitable manner, including, but not limited to, being integral with the support frame 102, welding, clamping, soldering, tying, and the like.

The support frame 102 may be constructed of any suitable material, or combination of materials. For example, the entire support frame may be formed of a combination of plastic and/or metallic parts. The support rods 302 may be constructed of any suitable material. In one embodiment, the support rods 302 are monofilament rods. Further, the support rods 302 and/or the support frame 102 may be constructed of any suitable material and/or combination of materials including, but not limited to, metal, plastic, rubber, a wood, aluminum extrude, a synthetic material, a ceramic, and the like.

Figure 4:
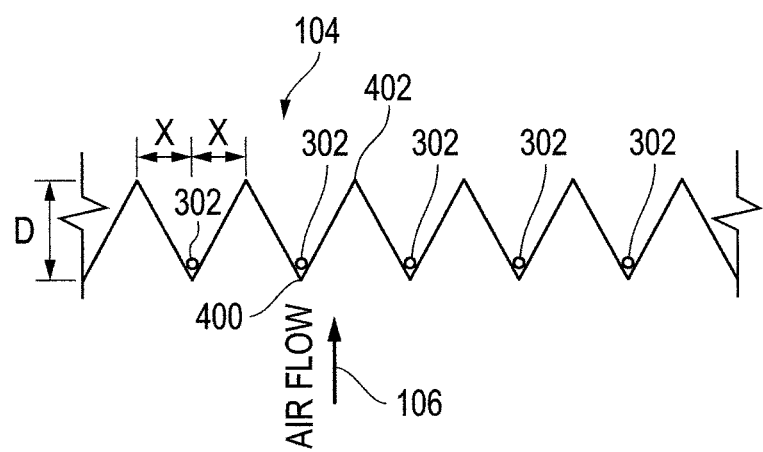
FIG. 4 depicts a diagram illustrating a side view of a filter media in an embodiment.

The filter media 104 may be a pleated media as shown in FIG. 4, in one embodiment. The filter media 104 may be constructed of a material that allows air to flow through the filter media 104 while trapping particles and/or dust in the filter media 104. The pleats may form a series of V shapes, wherein a plurality of peaks 400 and a plurality of valleys 402 of the Vs run substantially parallel to the support rods 302 and/or the parallel sides 202. The air filter 100 is configured so that the air flows toward the peaks 400 and into the valleys 402. As the air engages the filter media 104, the dust and particles in the air are caught in the filter media 104 and the air passes through the filter media 104 with less airborne particles. The V shapes of the pleats may minimize deflection of the air, as the air passes through the air filter 100. The angle of the pleats may be adjusted depending on the need of the user. Although the filter media 104 is described as having a series of V shapes, it should be appreciated that any suitable configuration for the filter media 104 may be used including, but not limited to, pleats having rounded peaks and valleys, a sinusoidal shape, a flat shape, and any shape describe herein for the media supports, and the like.

The peaks 400 and valleys 402 may be spaced a distance of X from one another when looking at the filter media 104 from an end. The distance X may be uniform across the entire filter 100, or may vary depending on the needs of the user. The depth D of the filter media 104 may be the distance from substantially all the peaks 400 to substantially all of the valleys 402, as shown in FIG. 4. The distance D may vary depending on the size of the support frame 102 and the HVAC system. In one embodiment, the distance D is 4"; however, it should be appreciated that the distance D may be any suitable distance depending on the HVAC system and the needs of the user.

The filter media 104 may be configured to engage the media supports 312. The ends of the filter media 104 which run substantially perpendicular to the peaks 400 may each engage a portion of the media supports 312. The media supports 312 may prevent the filter media 104 from moving into the ducting. Further, the media supports 312 may allow the filter media 104 to form a substantial seal between the filter media 104 and the media supports 312. In one embodiment, the filter media 104 rests on the upstream side of the media supports 312; however, it should be appreciated that the filter media 104 may engage the media supports 312 in any suitable manner so long as the media supports 312 engage the filter media 104.

In one embodiment, the peaks 400 of the filter media 104 may to rest on the support rods 302. The support rods 302 may prevent the filter media 104 from moving substantially into the ducting of the HVAC system during operation. Each of the peaks 400 may engage a support rod 302, or only select peaks 400 may engage the support rods 302 depending on the filter media's 104 ability to resist deflection during operation.

The filter media 104 may be made of polyester, in one embodiment. The filter media 104 may be formed by an extrusion process. Further, the filter media 104 may be any suitable filter material including, but not limited to, a cotton fiber material, a foam, high impact polystyrene, a fiberglass, and the like. Further, the filter media 104 may be coated with a coating material configured to attract dust, dirt and other particles or contaminants. The filter media 104 may include a coating. The coating may be applied to the filter media 104 in order to control odor, kill germs, kill bacteria, kill viruses, kill other biological contaminants, prevent bacteria, viruses and biological contaminants from passing the coating, and the like.

Further, the coating may include siloxane coatings, siloxane coatings applied as reactive silanols, Oligomeric silicon coating compositions, Silane-based coatings, Silicon-based or silicon-containing coatings and penetrants, alkylalkoxysilanes, alkyltrialkoxysilanes, oligomerous alkylalkoxysiloxanes, silsesquioxanes, silicates (including ethyl silicates, sodium silicates, and potassium silicates), methyl siliconates, blends of the above, and hybrid organic-inorganic paints and coatings including silicone alkyds, epoxy-siloxane coatings and acylic-siloxane coatings. a siloxanol polymer gel forming Si—O—Si chains that further cures to form a hard, adherent layer of silsesquioxanes ($RsiO_{2/3}$), a dense, siloxane film where organic moieties are oriented toward the surface of the film causing a permanent, positive surface potential.

The silicon atoms in the siloxane coating matrix strongly attract electrons, while the surface organic groups easily give up electrons. This phenomenon allows the electron cloud to skew downward, affecting an electron deficient surface that has a net positive charge for the life of the coating. The coating of any of the aforementioned and virtually any surface allows this unique property to form. Siloxane coatings are also very resistant to micro-organisms because of the very tight silica oxygen polymer formed, with the small sub-nanometer sized molecules, with the positive charged surface.

Surfaces treated with reactive silanols to the methods described herein are not only anti-microbial, but can be made sterile or the microbe population can be reduced to below the Minimal Infection Concentration (MIC) with no cleaning, minimal cleaning with simple soap and water instead of disinfectants or harsh chemicals, or can be decontaminated with harsh chemicals or disinfectants and no scrubbing without damaging the treated surfaces.

A simplified model in accordance with the present invention is shown below: This simplified model of cured siloxane applied as a reactive silanol illustrating organic groups oriented at the surface of an interpenetrating network of siloxane covalently bonded to the substrate. Oligomeric Siloxane coatings can be of two basic types. The first are the type of siloxane that is a multi-part catalyzed system as cited in the patents referenced or an organo-silane catalyzed in a similar manner. The second is a partially catalyzed siloxane coating where moisture is absorbed from the air or artificial means to complete hydrolysis of component silanes upon application; or a partially catalyzed siloxane where in silane hydrolyzation into silanols is interrupted by diluting with 50-90% by weight solvent. The partially hydrolyzed reactive silanol exhibits very low molecular weight silanols which can be applied to a surface by spray or wipe. After one to five minutes to allow the silanols to bond with the surface and to allow most of the solvent to solve off, a catalyzing or curing agent such as dilute acetic acid in water is used to supply moisture for hydrolysis, polycondesation, and siloxane formation into a more robust film to form a very thin coating that is not as durable as a multi-part catalyzed coating, but can be easily applied by untrained consumers or maintenance personnel as a single or two-part system, usually in a simple spray bottle. Such coatings applied to any of the filter media stated, will provide an electron deficient surface, in effect, a positively charged surface, that will not provide a media for multiplication of viruses and bacteria, and will through their structure of small molecules and hydrophobic and oleophobic surfaces provide an ease of cleaning of residues for a decontamination process. Organo-siloxanes and silanes are also envisioned under this invention; however, they do not exhibit the compact structure that oligomeric siloxanes applied as reactive silanol sols exhibit due to molecule size, stability, and durability and would be deficient in the cleaning ability as they would be more susceptible to penetration and adherence of microbial growth, and would also may be less polar on their surface displaying less positive surface charge. Also, if organo compounds such as polyls or large ($C_{16}$ or greater) organosilanes are used that may exhibit equal or greater surface charge, the permanence of the surface would be greatly reduced.

The filter media 104 may not conform to all sizes of support frames 102. However, due to the material used for the filter media 104, the filter media 104 may be easily cut to fit any of the air filters 100 described herein. For example, if there are too many pleats in the filter media 104 thereby making the installed filter media 104 extend beyond the parallel side 202, the user may simply cut, or tear the media along a peak 400 and/or valley 402 of the filter media 104. Further, if the length of the peaks 400 and valleys 402 extend beyond the length of the parallel sides 202 of the air filter 100, the user may simply cut or tear the filter media 104 across the pleats thereby shortening the length of the filter media 104.

The filter media 104, in an alternative or additional embodiment, may be a self supporting material, or combination of materials. For example, the filter media may have a wire mesh, and/or plastic mesh, which assist in supporting the filter media 104 in the air filter 100. In this instance, the number of support rods 302 may reduced or eliminated. Any suitable method of making the filter media self supporting may be used including, but not limited to a heat set self support filter media.

Figure 5:
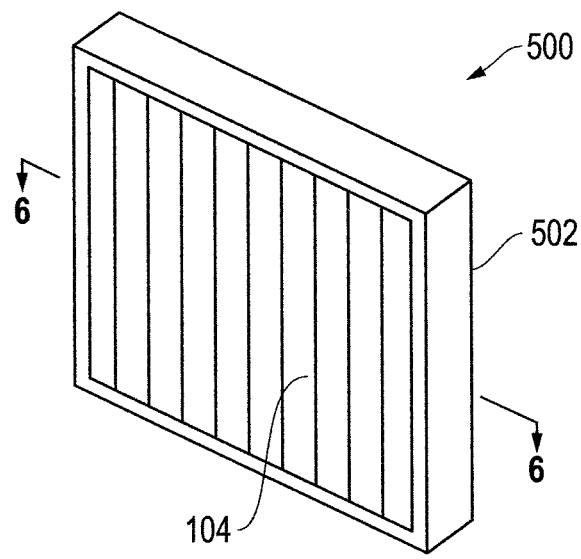
FIG. 5 depicts a diagram illustrating a schematic perspective view of an air filter in another embodiment.
Figure 6:
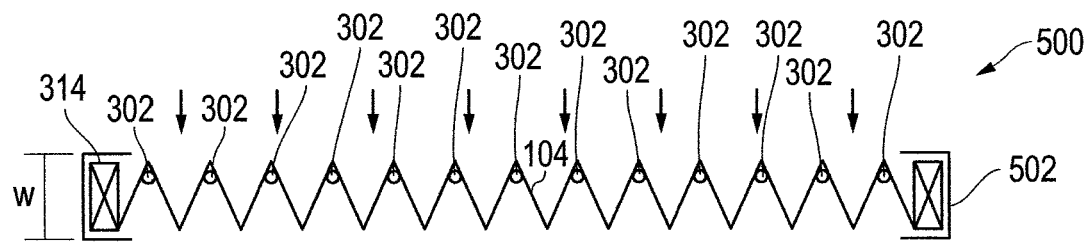
FIG. 6 depicts a diagram illustrating a cross sectional view of an air filter in another embodiment.

FIG. 5 depicts an air filter 500 according to yet another embodiment. The air filter 500 may include a support frame 502 and the filter media 104. The filter media 104 may be configured to be removed and replaced from the air filter 500 without the need to replace the support frame 502. The air filter 500 may be adapted to fit within an existing HVAC return air grille. To this end, the support frame 502 of the air filter 500 may be sized to have similar perimeter dimensions as a traditional cardboard air filter. For example, the support frame 502 may have a width W, as shown in FIG. 6, that is similar to most residential HVAC grilles, for example a 1" depth. Further, the support frame may have a any suitable width W depending on the HVAC system including, but not limited to, ½" 2", 3," 4", 5", 6", 7" and larger and any width there between.

FIG. 6 depicts a top cross sectional view of the filter 500. The filter 500 may include the support rods 302 and the filter media clips 314 as described herein. The support rods 302 may couple to the filter 500 in a similar manner as described above. The filter media clips 314 may be any suitable device for securing the filter media 104 to the support frame 502. The filter 500 may further include one or more media supports 312. The media supports 312 may be similar to the media supports 312 described above. The air filter 500 may be of particular use in an HVAC system having a slot, not shown, which the air filter 500 may slide in and out of in order to change the filter media 104. The slot may prevent the use of a filter 100 having a duct portion which would make the air filter 100 thicker than the slot.

FIG. 7A depicts a front view of the perpendicular side 200 of the air filter 500 in another embodiment. The perpendicular side 200 may include the media supports 312, an opening 700 for receiving the support rods 302, an optional groove 702, and an optional stop 704. The media supports 312 are shown as being substantially V shaped and having rounded peaks 400 and valleys 402; however, it should be appreciated that the media supports 312 may have any suitable shape, including any shape described herein. The media supports 312 assist in supporting the filter media 104 as described above. The openings 700 for receiving the support rods 302 may be located below the peak 400 of the media supports 312.

FIG. 7B depicts a top view of the perpendicular side 200 with the support rods 302 and coupled to the parallel side 202. The parallel side 202 is configured to couple to the perpendicular side 200 by any fastener 306 described herein. The groove 702 may run substantially the length of the perpendicular side 200, as shown, or only run a portion of the length. The groove 702 on the perpendicular side 200 may prevent torque of the entire support frame 502 once assembled. To this end, a rail 706, and/or profile of the parallel side 200 may engage, and/or couple, to the groove 700 once assembled. Thus, the rail 706 and the groove 700, when engaged, prevent the sides 200, and 202 of the support frame 502 from moving in any direction relative to one another other than along the longitudinal axis of the parallel side 202. Therefore, the groove 700 and rail 706, prevent the parallel side 202 from rotating, and/or twisting relative to the perpendicular side 200. The groove 700 and the rail 706 therefore, may increase the rigidity of the frame support 502. The groove 700, as shown, is a triangular shaped groove configured to house the triangular shaped rail 706 of the parallel side 202. However, it should be appreciated that the groove 700 and/or the rail 706 may have any suitable shape capable of decreasing relative movement between the perpendicular side 200 and the parallel side 202 including, but not limited to, a rectangular shape, a rounded shape, a boss, a series of profiles, and the like.

The stop 704 may be configured as a limit stop for the parallel side 202. When the parallel side 202 is engaged to the perpendicular side 200, the stop 704 may prevent the parallel side 202 from moving past the end of the perpendicular side 200. As shown, the stop 704 is a lip, or edge, that extends out beyond the end of the perpendicular side 200; however, it should be appreciated that the stop may be any suitable shape for preventing the parallel side 202 from moving beyond the stop 704. When the parallel side 202 is engaged with the stop 704, the edge of the parallel side 202 and the stop 704 may prevent the parallel side 202 from rotating relative to the perpendicular side 200. The stop 704 may be used in addition to, or as an alternative to, using the groove 702 and rail 706 to increase rigidity of the support frame 502.

In yet another alternative embodiment, the perpendicular side 200 may include a pocket (not shown), in which the end of the parallel side 202 is inserted. The pocket may surround a portion of the parallel side 202 thereby preventing the parallel side 202 from moving in any direction except for out of the pocket along the longitudinal axis of the parallel side 202. The pocket may include, the groove 700 and/or the stop 704 in order to prevent rotation and increase rigidity of the support frame 704.

The perpendicular side 200 may include an intermediate wall 708, as shown in FIGS. 7A-7C. The intermediate wall 700 may be couple to, or integral with, one end of the media supports 312. The intermediate wall 708 may include the opening 700. The opening 700 may be configured to allow the support rods 302 to couple to the support frame 502. A back view of the intermediate wall 708 is shown in FIG. 7C. As shown, the intermediate wall 708 may include a portion of the groove 702. Thus, the intermediate wall 708 may engage a portion of the rail 706 as the parallel side 202 engages the support frame 502.

The support rods 302 may secure to the perpendicular side 200 by any method described herein. The support rods 302 may couple to the openings 700 on the intermediate wall 708. Further, the support rods 302 may secure to an exterior wall 710, as shown in FIG. 7B, of the perpendicular side 200 in a similar manner as described herein. In yet another alternative embodiment, each of the support rods 302 may include a bend 712, or hook, as shown in FIG. 7D. The bend 712 may be configured to assist the user in assembling the support frame 502. In this embodiment, the user may lay each of the perpendicular sides 200 down on their exterior walls 710, as shown in FIG. 7E. Each end 714 of each of the support rods 302 may be placed through the openings 700 in the intermediate wall 708. The support rods 302 may go into the openings 700 up to the point where some portions of the bend 712 engages the opening 700. The user may repeat this step until all of the ends 714 of the support rods 302 are in a respective opening 700. The user may then rotate each of the perpendicular sides 200 in a direction that follows the bend 712 of the support rod 302. As the user rotates the perpendicular sides 200, each of the openings 700 moves around the bend 712 in the support rod 302 until the portion of the support rod 302 between the end 714 and the bend 712 is substantially parallel with the intermediate wall 708, as shown in FIG. 7D. The bend 712 may prevent each of the support rods 302 from inadvertently disengaging from the perpendicular side 200.

With the support rods 302 engaged with each of the perpendicular sides 200, each of the parallel sides 200 may be coupled to the perpendicular sides 200 in order to form the support frame 502. The parallel side 202, as shown in FIG. 7F, includes the rail 706. As shown, the rail 706 is formed from a bend, or crimp in the plate that forms the parallel side 202. However, it should be appreciated that the rail 706 may be formed in the parallel side 202 by any suitable method including, but not limited to, coupling the rail 706 to a flat plate, forming the parallel side 202 as a flat plate with an integral rail 706, and the like. The rail 706 may engage the groove 702 and the perpendicular side 200 may be engaged to the parallel side 202 using a fastener, and/or any of the methods and devices described herein. With the perpendicular sides 200 secured to the parallel sides 202, the support frame 502 is constructed and ready for use with a filter media 104.

The filter media 104, may be coupled to the support frame 502 is a similar manner as described above. For example, each of the peaks 400 of the filter media 104 may be placed on a corresponding peak of the media supports 312. The interior of the peaks 400 of the filter media 104 may engage, and/or rest on the support rods 302 in the interior portion of the support frame 502. The ends of the filter media 104 which engage the parallel sides 202 may include the media clips 314 for engaging the filter media 104 to the parallel sides. The media clips 314 may be any suitable clamping device, including those described herein. The air filter 500 may then be placed in service in an HVAC system. The filter media 104 may be replaced without replacing the support frame 502 during the life of the support frame 502, and/or the HVAC system.

In an additional embodiment, The air filters 100 and 500 may include a change indicator which alerts the user that the filter media 104 has become inefficient and needs to be changed. The change indicator may be a color coating on one or more of the support rods 302. In this embodiment, at least one of the support rods 302 would have a color that was visible through a new, or clean, filter media 104. For example, the support rod 302 may be a bright orange color which a user could see through the filter media 104 when the filter media 104 was installed on the support frame 102/502. As the air filter 100/500 is used, dust and particles gather on the filter media 104. Eventually, the build up of dust and particles may obstruct the user's view of the color coating on the support rods 302. This visual indicator would let the user know that the filter media 104 was near the end of its life and needed to be changed. Further, the change indicator may be a visual aid embedded directly into the filter media 104, or the media supports 312. This visual indicator embedded in the filter media 104 would function in a similar manner as the color coating on the support rod 302.

In another embodiment, the perpendicular sides 200 and/or the parallel sides 202 may be cut in order to shorten the length of the sides 200 and 202. Thus, the sides 200 and 202 may be shipped to the retail outlet and/or sold to a customer in a size that is large enough to fit in almost any HVAC system. If the customer has a smaller return air filter grille than the length of the perpendicular side 200 and/or the parallel side 202, the customer may cut the length of the side 200 and/or 202 to fit within the return air filter grille. When cutting the perpendicular side 200 in may be advantageous to cut between the media supports 312. The media supports 312 may be spaced on 1" centers. Thus, when the perpendicular side 200 is cut between the media supports 312 the length reduction may be easily calculated by counting the number of media supports 312 to be removed from the perpendicular side 200. Once the length is shortened to the appropriate size, the end of the recess 308 may be exposed and have no end for securing the fastener 306 to the perpendicular side 200. An optional end cap (not shown) may be installed on the exposed recess in order to secure the fastener 306 to the perpendicular side 200. In one embodiment, the end cap has a shape similar shape as the interior recess 308. The end cap may be slight smaller than the recess 308 and configured to fit within the recess 308. The end cap may have a fastener side which is configured to engage the exposed end of the recess 308, thereby preventing the end cap from moving completely into the recess. The fastener side may have the aperture 304 for securing the fastener 306 to the end cap and thereby the perpendicular side 200. Although described as an end cap, it should be appreciated that any suitable device for securing the perpendicular side 200 to the parallel side 202 may used.

In yet another alternative embodiment, the perpendicular sides 200 and the parallel sides 202 of the support frame 102/502 may be longitudinally adjustable in order to size the support frame 102/502 to fit any HVAC system. The sides 200 and 202 may be longitudinally adjustable by any suitable method including, but not limited to, a telescoping side member, an extension that may be added to each of the sides, and the like.

The use of the air filter 100/500 described herein allows a user, to purchase the support frame 102/502 and use the support frame 102/502 during the life of the HVAC system. The user may then only replace the filter media 104 during the life of the HVAC system, as described above. The support frames 102 and 502 may be shipped and sold as separate units from the filter media 104, although it should be appreciated that they may be sold together. Because the support frames 102 and 502 are collapsible, they may be shipped and stored in a collapsed form thereby greatly reducing the space required for shipping. Further, the frames 102 and 502 are less susceptible to damage in a collapsed form, thereby reducing the number of defective air filters 100/500 after shipping.

Figure 8:
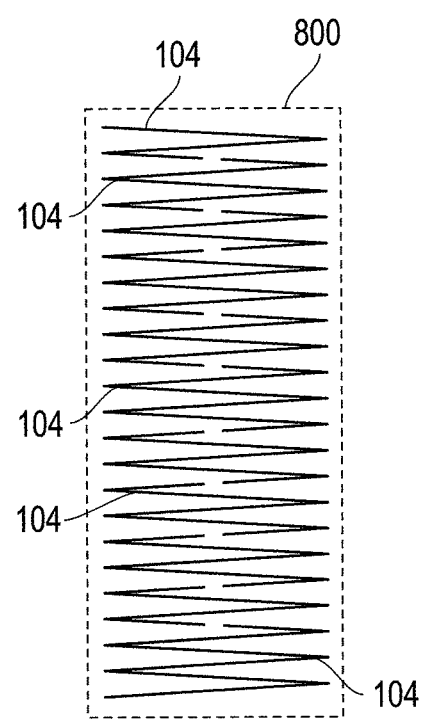
FIG. 8 depicts a diagram illustrating a schematic view of a plurality of filter media in a container in an embodiment.

FIG. 8 depicts several filter media 104 stored in a container 800. The container 800 may be any container for storing, shipping, selling, and/or working with the filter media 104 including, but not limited to, a box, a plastic bag, a paper bag, one or more elastic bands, a hand bad, a backpack, and the like. Because only the filter media 104 has to be replaced during the life of the support frame 102/502, multiple filter media 104 may be stored in a relatively small container, or box, and shipped from the manufacturer to retail, and/or service outlets. Thus, the manufacturer may store multiple filter media 104 in the container 800. Multiple containers 800 may be shipped to retail outlets and service provider outlets. The space savings in the trucks and railcars saved by storing multiple filter media 104 in the containers 800, versus the storing a traditional cardboard air filter amounts to at least an 80% freight reduction over the traditional air filters. Further, the retailer may save shelve space by selling the filter media 104 packages, and/or the container 800, which may contain several filter media 104. Due to the substantially flat nature of the filter media 104, the packages may be relatively flat and stacked on one another, and/or hung at the retail outlet.

Further, the air filter 100/500 may greatly reduce the time and manpower spent servicing multiple retail and/or residential HVAC systems. To this end, a description of servicing one retail outlet will be describe; however, it should be appreciated that the method described below may be used in conjunction with a number of retail outlets, residential outlets and a combination thereof. Typical retail outlets have several HVAC systems requiring regular filter replacement located on the roof of the retail outlet. Traditionally, the service provider has had to carry several boxes of bulky cardboard filters up to the top of the retail outlet. This would require several trips with the service provider carrying each of the bulky boxes of filters. Using the air filters 100 and/or 500, the service provider may load one or more containers 800 with multiple filter media 104. The service provider may load one or more of the containers 800 in a vehicle, and drive to the retail outlet. One container 800 may include enough of the filter media 104 to replace the filters in each HVAC system at the retail outlet. In one example the container 800 may be a bag, for example a backpack which the service provider may easily carry to the top of the retail outlet. The service provider may then remove a preinstalled frame 100/500 from an HVAC system. The service provider may then remove the old filter media 104 from the support frame 102/502 and place it in a second container, for example a garbage container. The service provider may then remove a single filter media 104 from the container 800 and secure the new filter media 104 to the support frame 102/502. The service provider may then replace the air filter 100/500 with the new filter media 104 back in the HVAC system. The service provider may then walk to the next air filter to be replaced and repeat the steps above. When the service provider has completed replacing all of the filter media 104, they may return to the vehicle and dispose of the old filter media 104, or second container appropriately.

In an additional embodiment, a cart, or bag, (not shown) may be used to assist the service provider in replacing the filter media 104. The cart may include the container 800 having new filter media 104 and the second container, wherein used filter media are stored. The cart, or bag, may have one or more wheels and one or more handles. The service provider may bring the cart to the top of the retail outlet and wheel it from HVAC unit to HVAC unit. As the service provider replaces the filter media 104, they may grab a new filter media from the container 800 and place the used filter media in the second container.

In an additional embodiment, two or more air filters 100/500 may be secured together to form a larger air filter. For example, to produce a 20"×48" support frame, commonly used in commercial applications, three 16"×20" support frames 102/502 may be attached side by side. In this configuration, two sides 200 or 202 of two separate air filters 100/500 may couple together at two locations on the interior of the 20"×48" air filter. The two connected sides 200 or 202 would form a common rail which would act as a structural support for the interior of the larger air filter. Typically, the parallel sides 202 would be coupled together as the common rail. The common rail may also be used as a pleat support, in a similar manner as the support rods 302. This allows the filter media 104 to lay uninterrupted across multiple sections of frame.

The parallel sides 202 may be stacked on top of one another during shipping and fabrication in order to save space. Further, during the fabrication of the parallel sides 202 the sides may be stacked upon one another in an interlocking fashion thereby becoming like one solid bar. Cutting the stacked interlocked sides 202 produces a smooth edge on the sides 202 that requires no de-burring.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An air filter, comprising:
   a replaceable pleated filter media, wherein the pleated filter media has a plurality of peaks and valleys; and
   a support frame wherein the support frame further comprises:
      two substantially perpendicular sides, wherein the perpendicular sides are configured to be substantially perpendicular to the peaks and valleys of the pleated media;
      two substantially parallel sides, wherein the parallel sides are configured to be substantially parallel to the peaks and valleys of the pleated media and wherein a portion of each of the parallel sides is coupleable to a portion of the perpendicular side; and one or more support rods, wherein the support rods span an interior of the support frame in a direction substantially parallel with the peaks and valleys and wherein the one or more support rods are configured to engage the peaks with no support rods located in an interior upstream side of the pleated filter media.

2. The air filter of claim 1, further comprising a media support coupled to at least one of the perpendicular sides, wherein the media support extends into the interior of the air filter and is configured to support a portion of the filter media proximate the at least one of the perpendicular sides.

3. The air filter of claim 1, wherein the at least one of the perpendicular sides further comprises one or more openings for receiving a portion of the support rods.

4. The air filter of claim 3, where in the support rods further comprise a bend and wherein the bend is configured to secure the rod within the at least one of the perpendicular sides through the opening.

5. The air filter of claim 1, wherein the plurality of the support rods are configured to engage the plurality of peaks and none of the valleys.

6. The air filter of claim 1, wherein the support frame is collapsible for shipping or storage.

7. The air filter of claim 1, further comprising a change indicator configured to indicate that the replaceable pleated filter media has become inefficient.

8. An air filter, comprising:
   a replaceable pleated filter media, wherein the pleated filter media has a plurality of peaks and valleys; and
   a support frame wherein the support frame further comprises:
      two substantially perpendicular sides, wherein the perpendicular sides are configured to be substantially perpendicular to the peaks and valleys of the pleated media;
      two substantially parallel sides, wherein the parallel sides are configured to be substantially parallel to the peaks and valleys of the pleated media and wherein a portion of each of the parallel sides is coupleable to a portion of the perpendicular side; and one or more support rods, wherein the support rods span an interior of the support frame in a direction substantially parallel with the peaks and valleys and wherein at least one of the support rods is configured to engage a portion of the filter media, and wherein at least one of the perpendicular sides further comprises a groove wherein the groove is configured to receive a portion of at least one of the parallel sides.

9. The air filter of claim 8, wherein the at least one of the parallel sides further comprises a rail configured to engage the groove and wherein when engage the rail and groove prevent relative rotation between the at least one of the parallel sides and the at least one of perpendicular sides.

* * * * *